United States Patent
Petricoin (10) Patent No.: US 8,229,228 B2
(45) Date of Patent: Jul. 24, 2012

(54) IMAGE ANALYSIS USING A PRE-CALIBRATED PATTERN OF RADIATION

(75) Inventor: Dennis M. Petricoin, Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 958 days.

(21) Appl. No.: 12/211,540

(22) Filed: Sep. 16, 2008

(65) Prior Publication Data

US 2010/0067738 A1 Mar. 18, 2010

(51) Int. Cl.
*G06K 9/46* (2006.01)
*G06K 9/00* (2006.01)

(52) U.S. Cl. ........................ 382/191; 382/100
(58) Field of Classification Search ........... 382/100–310
See application file for complete search history.

(56) References Cited

U.S. PATENT DOCUMENTS

| | | | |
|---|---|---|---|
| 2,815,179 A | 12/1957 | Keljik | |
| 3,902,182 A | 8/1975 | Hillborg | |
| 4,234,907 A | 11/1980 | Daniel | |
| 4,335,962 A * | 6/1982 | Di Matteo et al. | 356/604 |
| 4,355,328 A | 10/1982 | Kulik | |
| 4,558,215 A * | 12/1985 | Kaneko et al. | 250/222.1 |
| 4,575,304 A * | 3/1986 | Nakagawa et al. | 414/730 |
| 4,627,511 A * | 12/1986 | Yajima | 180/167 |
| 4,653,316 A * | 3/1987 | Fukuhara | 73/146 |
| 4,668,859 A * | 5/1987 | Winterer | 250/221 |
| 4,687,326 A * | 8/1987 | Corby, Jr. | 356/5.01 |
| 4,742,555 A * | 5/1988 | Tonkin | 382/274 |
| 4,751,658 A * | 6/1988 | Kadonoff et al. | 701/301 |
| 4,843,565 A * | 6/1989 | Rose | 701/301 |
| 4,851,661 A * | 7/1989 | Everett, Jr. | 250/221 |
| 4,954,962 A * | 9/1990 | Evans et al. | 701/28 |
| 5,034,986 A | 7/1991 | Karmann et al. | |
| 5,040,116 A * | 8/1991 | Evans et al. | 701/28 |
| 5,877,688 A * | 3/1999 | Morinaka et al. | 340/584 |
| 6,522,775 B2 * | 2/2003 | Nelson | 382/133 |
| 6,553,138 B2 * | 4/2003 | Rozin | 382/154 |
| 6,559,883 B1 * | 5/2003 | Fancher et al. | 348/164 |
| 6,757,008 B1 | 6/2004 | Smith | |
| 6,811,264 B2 * | 11/2004 | Raskar et al. | 353/94 |
| 6,829,371 B1 * | 12/2004 | Nichani et al. | 382/103 |
| 6,880,948 B2 | 4/2005 | Koch et al. | |
| 6,928,131 B2 * | 8/2005 | Olshansky et al. | 376/158 |
| 6,940,998 B2 | 9/2005 | Garoutte | |
| 6,961,443 B2 * | 11/2005 | Mahbub | 382/100 |
| 6,970,600 B2 * | 11/2005 | Abe | 382/187 |
| 7,082,182 B2 * | 7/2006 | Zhou et al. | 378/10 |
| 7,084,901 B2 | 8/2006 | Smith | |

(Continued)

FOREIGN PATENT DOCUMENTS

JP 11271467 10/1999
(Continued)

*Primary Examiner* — Manav Seth
(74) *Attorney, Agent, or Firm* — Michael Best & Friedrich LLP (57) ABSTRACT

A system and method of image content analysis using a pattern generator that emits a regular and pre-calibrated pattern of non-visible electromagnetic radiation from a surface in range of a camera adapted to perceive the pattern. The camera captures images of the perceived pattern and other objects within the camera's range, and outputs image data. The image data is analyzed to determine attributes of the objects and area within the camera's range. The pattern provides a known background, which enables an improved and simplified image analysis.

20 Claims, 5 Drawing Sheets

U.S. PATENT DOCUMENTS

| | | | |
|---|---|---|---|
| 7,167,575 B1 * | 1/2007 | Nichani et al. | 382/103 |
| 7,218,756 B2 | 5/2007 | Garoutte | |
| 7,221,775 B2 | 5/2007 | Buehler | |
| 7,280,673 B2 | 10/2007 | Buehler et al. | |
| 7,369,642 B2 * | 5/2008 | Eilbert et al. | 378/57 |
| 7,399,220 B2 * | 7/2008 | Kriesel et al. | 452/157 |
| 7,417,440 B2 * | 8/2008 | Peschmann et al. | 324/637 |
| 7,579,845 B2 * | 8/2009 | Peschmann et al. | 324/637 |
| 7,620,209 B2 * | 11/2009 | Stevick et al. | 382/106 |
| 7,912,583 B2 * | 3/2011 | Gutmann et al. | 700/245 |
| 2003/0147484 A1 * | 8/2003 | Olshansky et al. | 376/157 |
| 2004/0213378 A1 * | 10/2004 | Zhou et al. | 378/122 |
| 2006/0025888 A1 * | 2/2006 | Gutmann et al. | 700/245 |
| 2006/0098729 A1 | 5/2006 | Shen | |
| 2007/0030955 A1 * | 2/2007 | Eilbert et al. | 378/87 |
| 2008/0007628 A1 | 1/2008 | Hsieh | |

FOREIGN PATENT DOCUMENTS

| | | |
|---|---|---|
| JP | 2003288675 | 10/2003 |
| WO | 02/056594 | 7/2002 |

* cited by examiner

IMAGE ANALYSIS USING A PRE-CALIBRATED PATTERN OF RADIATION

BACKGROUND

1. Field of Invention

The present invention relates to systems and methods of image content analysis using a camera that perceives a regular and pre-calibrated pattern of electromagnetic radiation emitted from a pattern generator.

2. Description of the Related Art

Closed-circuit television (CCTV) systems are used in both public and private security systems. CCTV systems are used, for instance, in monitoring areas to detect, deter, and gather information about unwanted activities. CCTV systems enable fewer persons to monitor more areas than would otherwise be possible with security guards required to physically patrol each area of interest.

SUMMARY

Improving the images produced and the analysis of images can increase the effectiveness of a CCTV system. For instance, a higher-resolution image can enable security personal or image analysis software to more easily identify a person or object on the displayed image. Nevertheless, even with high-resolution images, certain backgrounds and/or lighting conditions can blend with an object, making it difficult to discern the contents of an image. Previous solutions have included using cameras with extra sensitivity or IR illuminators, which can improve image analysis in certain scenarios, e.g., areas with low-light conditions. However, these solutions can increase power consumption and have other disadvantages. Therefore, further improvements are desired to simplify video content analysis and to more effectively monitor challenging conditions.

Embodiments of the invention implement a system and method of image content analysis using a pattern generator that emits a pre-calibrated pattern from a surface, such as a wall, that is in range of a camera adapted to perceive the pattern. The camera captures images of the perceived pattern and other objects within the camera's range, and outputs image data. The image data is analyzed to determine attributes of the objects and area within the camera's range using the pattern. The pattern provides a known background, which enables an improved and simplified image analysis.

In one embodiment, the invention provides an image content analysis security system including a pattern generator, a camera, and an image analysis device. The pattern generator is configured to produce a pattern of non-visible electromagnetic radiation on a wall or floor. The camera is configured to perceive the pattern of non-visible electromagnetic radiation, capture images including an object and at least a portion of the pattern, and output captured images as image data. The image analysis device is configured to receive calibration information, receive the image data, and determine attributes of the object based on the image data and calibration information.

In another embodiment, the invention provides a method of analyzing image content for a security system. The method includes the steps of positioning a pattern generator on a wall or a floor, providing calibration information to an image analysis device, and emitting a pattern of non-visible electromagnetic radiation from the pattern generator. The method further includes positioning a camera at a location so that the camera perceives the pattern of non-visible electromagnetic radiation and captures images of an area containing an object and at least a portion of the pattern. The method also includes outputting the captured images as image data to the image analysis device, determining attributes of the object based on the image data and the calibration information, and outputting at least one determined attribute.

In yet another embodiment, the invention provides an image content analysis security system comprising a pattern generator means, a camera means, and an image analysis means. The pattern generator means is configured to produce a pattern of non-visible electromagnetic radiation on a wall or floor. The camera means is configured to perceive the pattern of non-visible electromagnetic radiation, capture images including an object and at least a portion of the pattern, and output captured images as image data. The image analysis means is configured to receive calibration information, receive the image data, and determine attributes of the object based on the image data and calibration information.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
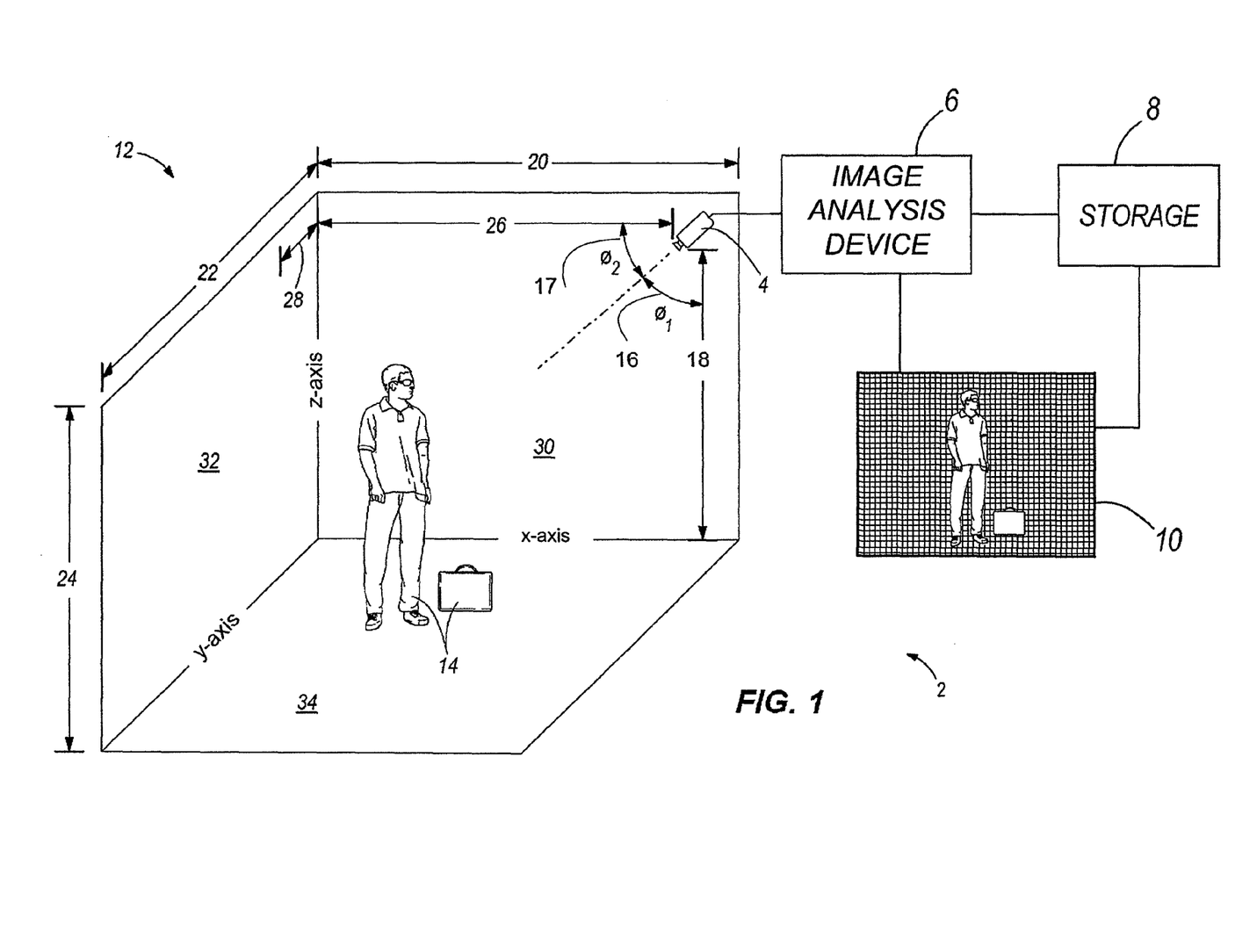
FIG. 1 shows an image content analysis security system.
Figure 2:
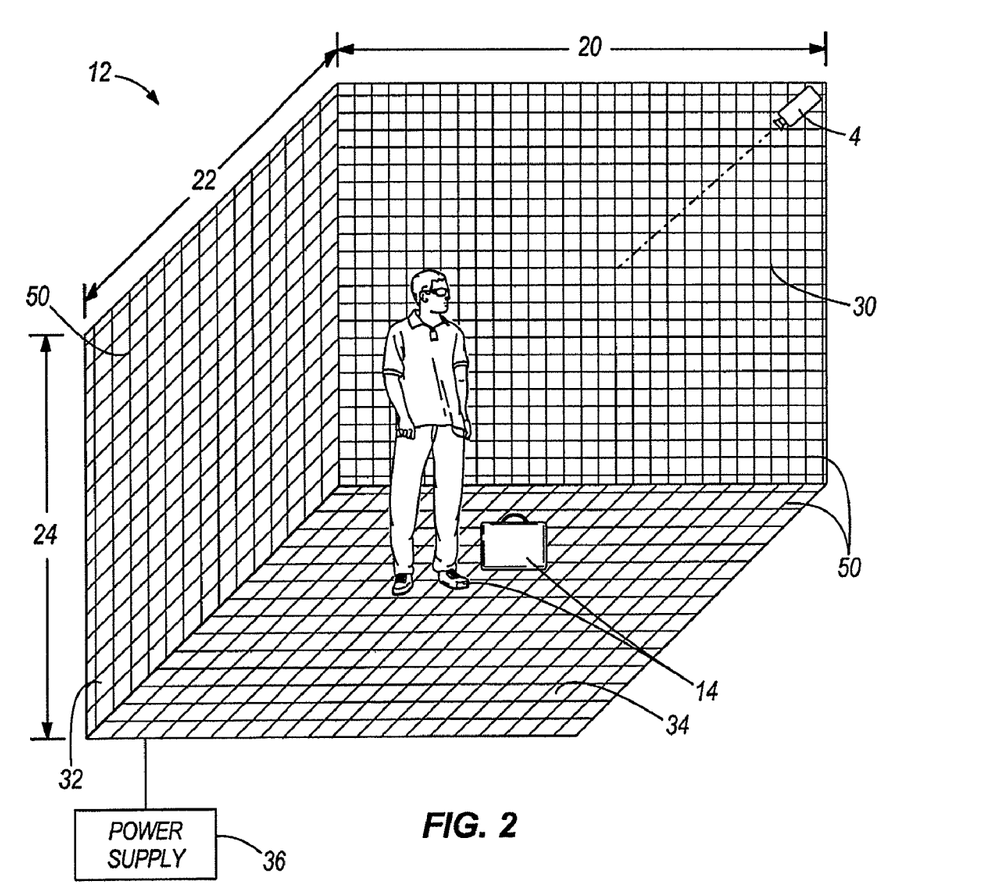
FIG. 2 shows a pattern generator in the image content analysis security system.

An image content analysis security system 2 is illustrated in FIGS. 1 and 2. The system 2 includes a camera 4, an image analysis device 6, a storage medium 8, a display device 10, and pattern generator 50 (not shown in FIG. 1). In FIG. 1, the camera 4 is shown mounted on wall 30 within a room 12. The room 12 has a width 20 (along the x-axis), length 22 (along the y-axis), and height 24 (along the z-axis). Objects 14 are positioned within room 12. Camera 4 is mounted at a height 18 from the floor 34, a distance 26 from wall 32, and a distance 28 from wall 30. The camera 4 is directed $\theta_1$ degrees (angle 16) away from the z-axis and $\theta_2$ degrees (angle 17) away from the x-axis. Image analysis device 6, storage medium 8, and display device 10 are shown located in an area outside of room 12, however, some or all may be placed within the room 12.

In most embodiments, camera 4 is a camera capable of perceiving non-visible and visible electromagnetic radiation, capturing images that include perceived (or captured) non-visible and visible electromagnetic radiation, and outputting the captured images. Visible electromagnetic radiation includes electromagnetic radiation that is visible by a human, i.e., electromagnetic radiation with a wavelength of approximately 400 to 700 nanometers. Such visible electromagnetic radiation includes violet, blue, green, yellow, orange, and red light. Non-visible electromagnetic radiation is a electromagnetic radiation outside that which is visible by a human, i.e., electromagnetic radiation with an approximate wavelength of less than 400 nanometers or greater than 700 nanometers. Such non-visible electromagnetic radiation includes radio waves, microwaves, infrared, ultraviolet, x-ray, and gamma rays.

Image analysis device 6 includes hardware, such as a memory, processing unit or microprocessor, and I/O components, as well as software programs. The hardware and software of image analysis device 6 are capable of video content analysis as described below. In other embodiments, the video content analysis is implemented primarily or entirely in hardware. Storage medium 8 can be an analog or digital storage device, such as an analog video recorder, a digital video recorder, a hard drive, a flash drive, or the like. Display device 10 is an output device capable of displaying images or video, such as a liquid crystal display (LCD), cathode ray tube (CRT), or plasma monitor. The components of the image content analysis security system 2 may communicate using available protocols and electrical connections, including combinations of hard-wired or wireless connections. Additionally, the image content analysis security system 2 is not limited to a single camera 4, image analysis device 6, storage medium 8, or display device 10.

Turning to FIG. 2, a pattern generator 50 is shown in grid-form on walls 30 and 32 and floor 34. In some embodiments of the invention, the pattern generator 50 is configured to emit non-visible electromagnetic radiation, but no visible electromagnetic radiation. In other embodiments, the pattern generator 50 may generate both non-visible and visible electromagnetic radiation, or only visible electromagnetic radiation.

Depending on the embodiment, the pattern generator 50 is either active or passive. An active pattern generator uses an electric power supply 36 to generate electromagnetic radiation. FIG. 2 depicts the power supply 36 that is used for the pattern generator 50 if it is an active pattern generator. In one embodiment, an active pattern generator is implemented by weaving wire in a substrate, such as wallpaper, and attaching the substrate to a wall. The woven wires are then electrically connected to a power source that produces low levels of current, which causes the wires to emit non-visible electromagnetic radiation, such as infrared radiation or heat waves. In another embodiment, similar wires are woven and then attached directly to a surface using an adhesive, for instance, instead of interweaving it with the substrate.

In another embodiment, an active pattern generator is constructed using optical fibers that are formed to emit electromagnetic radiation when attached to light source. The fiber optic cables can be woven into a substrate (e.g., wall paper or a similar wall covering) that is attached to a wall, or attached directly to a wall using an adhesive, for instance.

In yet another embodiment, light emitting diodes (LEDs) or organic light emitting diodes (OLEDs) are used to form the pattern generator 50. The LED or OLED pattern generator is connected to a power supply 36. The light emitting components (i.e., the LEDs or OLEDs) emit electromagnetic radiation, preferably non-visible electromagnetic radiation. LEDs or OLEDs can be printed in an electrically interconnecting fashion onto a substrate, such as wallpaper, that is attached to the surface of a wall or floor. Alternatively, the LEDs or OLEDs are formed in tiles that are electrically interconnected and attached to or mounted on a substrate or directly to a surface.

A passive pattern generator does not use an electric power supply or other source of light or energy. Instead, it receives energy through ambient electromagnetic radiation or through chemical reactions. If the pattern generator 50 in FIG. 2 is passive, the power supply 36 is not necessary. In one embodiment, a passive pattern generator is formed by painting a material, such as a phosphor, on a surface that emits non-visible electromagnetic radiation under certain conditions. Depending on the material chosen, the electromagnetic radiation is either emitted immediately upon exposure to electromagnetic radiation or has a delayed release so that the emission continues after the exposure ceases. The radiation could also be visible or non-visible. The wavelength of the electromagnetic radiation necessary to cause the desired output is also based on the phosphor chosen. Other passive pattern generators may be formed by applying a material that emits electromagnetic radiation after a chemical reaction due to exposure to a particular substance, such as oxygen. Phosphorescing and fluorescing materials that exhibit similar properties sufficient for use as a passive pattern generator are contemplated for embodiments of the invention. Factors considered in sufficiency for use include the duration of their emissions, the type of energy consumed, the amount of energy consumed versus the amount of energy emitted ratio, and the ease of attaching the substance to a surface such as a wall or floor.

In another embodiment, the pattern generator 50 has both active and passive components. For instance, embodiments may include a pattern generator 50 that uses passive components primarily, but switches to active components if the pattern generator 50 no longer has energy to generate a pattern passively. Passive, active, and combination passive-active pattern generators can be configured to emit visible electromagnetic radiation, non-visible electromagnetic radiation, or both.

The pattern generator 50 may be placed on a combination of full or partial walls, floors, ceilings, or furnishings within an area to be monitored. The pattern generator 50 is not limited to the grid-form in FIG. 2. It can include any repeating shapes, such as circles, rectangles, triangles, etc.; a dot-arrangement, for instance, where in place of the grid of lines shown in FIG. 2, a non-visible electromagnetic radiation source is placed where each of the grid lines intersect; a fractal pattern; or other arrangements so long as the image analysis device 6 is aware (via a pre-calibration process described below) of the arrangement.

Figure 3:
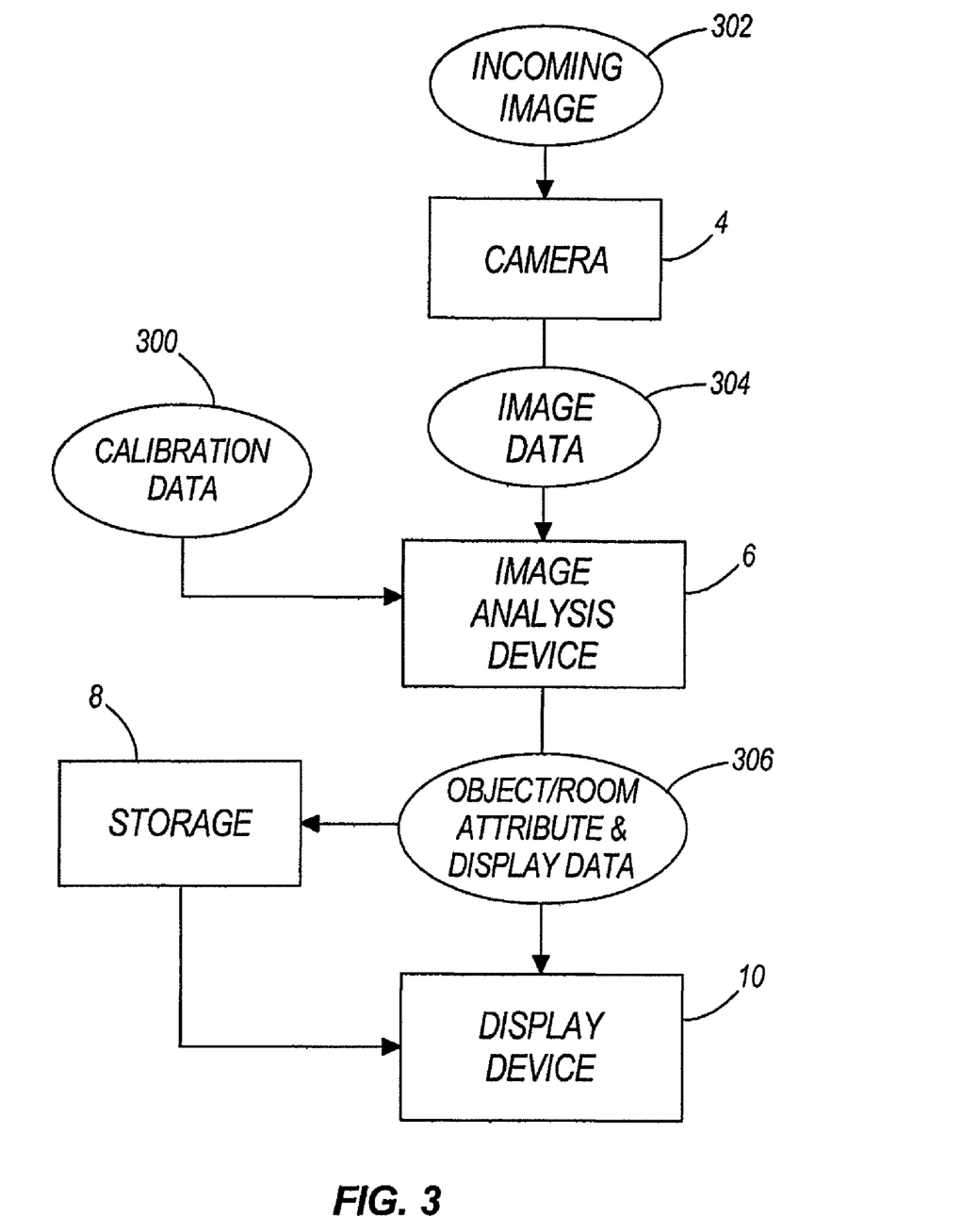
FIG. 3 shows an architecture of an image content analysis security system.
Figure 4:
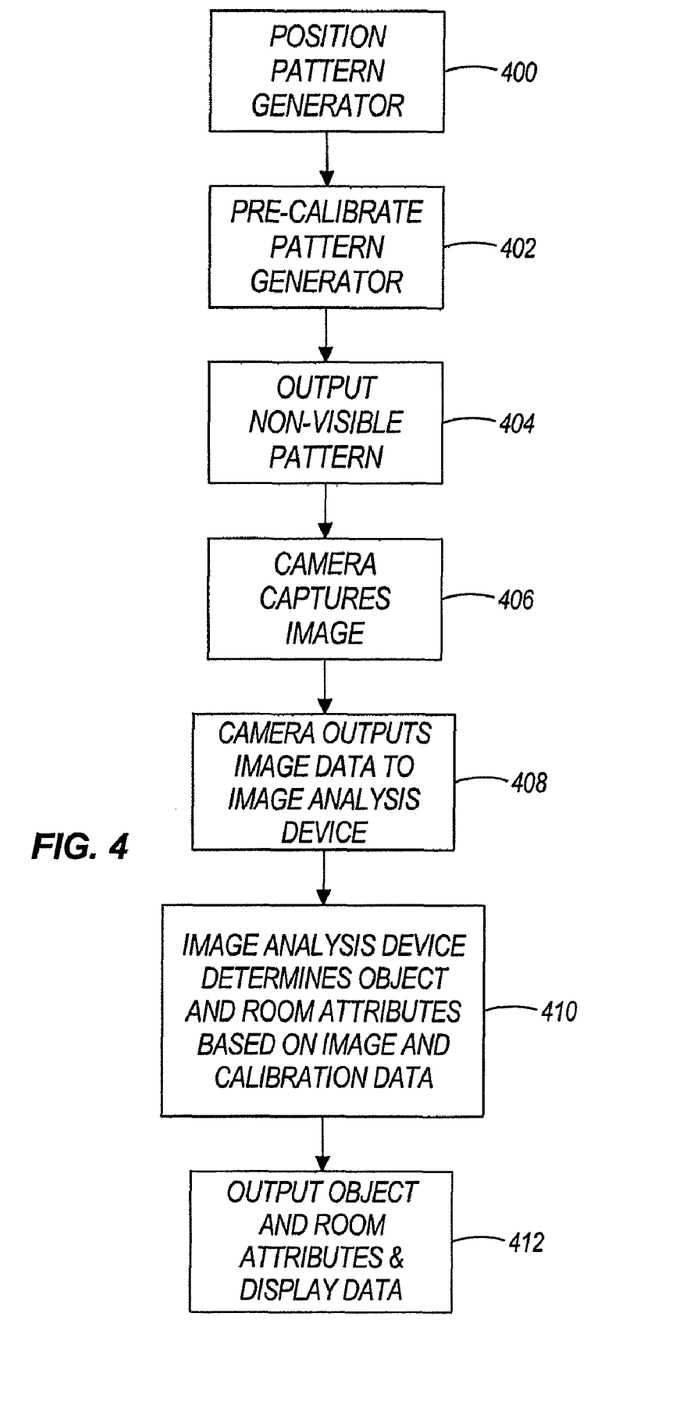
FIG. 4 is a flowchart of the operation of an image analysis system.

The operation of an embodiment of the image content analysis security system 2 in FIGS. 1 and 2 will next be described with reference to FIGS. 3 and 4. The pattern generator 50 is positioned on floor 34 and walls 30 and 32 (step 400). The image analysis device 6 is provided with calibration data 300 to pre-calibrate the pattern generator 50 (step 402). The calibration data 300 includes pattern information and/or camera position information. Pattern information can include 1) the type of pattern, e.g., square-grid, rectangle-grid, dot-grid, etc., 2) the size or spacing of each element of the pattern, e.g., each square in a grid pattern measures six inches long and six inches wide, and 3) the wavelength range of the electromagnetic radiation that the pattern generator will output. Camera position information includes the height 18 of the camera, the distance 26 of the camera from a first wall 32 in camera view, the distance 28 of the camera from a second wall 30 in camera view, an angle 16 from the z-axis, and an angle 17 from the x-axis. In other embodiments, camera position information includes different angles and/or different measurements that are sufficient to enable the image analysis device 6 to determine object and room attributes. Exemplary object and room attributes determinable using the pattern generator include size, shape, and angles of walls, floors, ceilings.

In one embodiment, after pre-calibration, the pattern generator is activated, begins, or continues outputting a non-visible pattern in the infrared range of the electromagnetic radiation spectrum (step 404). Infrared radiation has a wavelength range of approximately 1 millimeter to 750 nanometers. A camera captures an incoming image 302 that contains at least a portion of the output non-visible pattern (step 406) and then outputs the captured images as image data 304 to an image analysis device 6 (step 408). Thereafter, the image analysis device 6 uses video content analysis software and/or hardware to analyze the image data 304 and determine attributes of the room and/or any objects present in the room using the calibration data 300 and image data 304 (step 410). Among other methods, the video content analysis software recognizes an object in a captured image by detecting gaps in areas where the output pattern should otherwise be present according to the calibration data. Finally, the image analysis device outputs the determined object and room attribute and display data 306 to a display device 10 or storage medium 8 (step 412).

Figure 5:
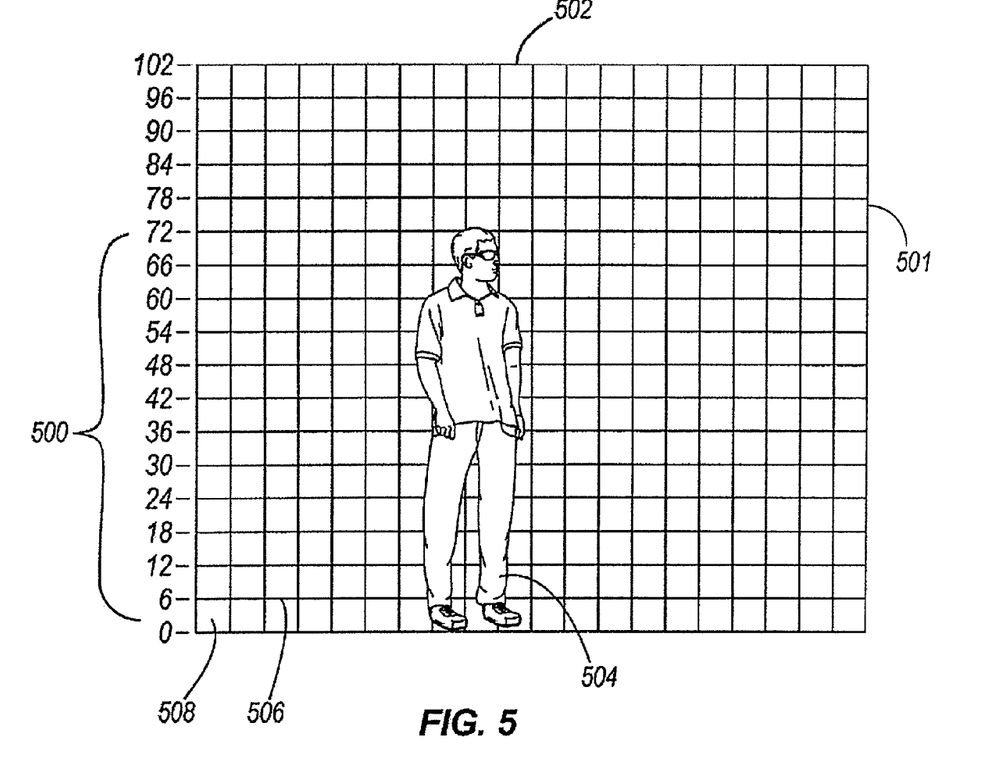
FIG. 5 shows an object in front of a pattern generator.

FIG. 5 depicts an example of image analysis to determine room and object attributes using the pattern output by a pattern generator. To simplify the explanation, the example does not consider compensation for camera angles and position. Pattern generator 506 is first positioned on wall 508. Thereafter, during pre-calibration, the image analysis device 6 is informed that there are six inches between each grid line. The pattern generator 506 then begins outputting non-visible electromagnetic radiation in the grid pattern shown in FIG. 5. A camera captures an image including object 504, the pattern output by pattern generator 506, and wall 508, and then outputs it as image data to the image analysis device. The image analysis device's video content analysis software or hardware recognizes that twelve horizontal grid lines 500 in a vertical column 502 are broken. Since twelve lines 500 are broken, and each line is spaced six inches apart, the image analysis device 6 determines that the object spans at least seventy-two (72) inches. The thirteenth line 501 is not broken, however, so the image analysis device determines that the object must be less than seventy-eight (78) inches tall. Furthermore, the image analysis device can calculate a room dimension because it recognizes that there are eighteen horizontal grid lines total being output. Using that information, the image analysis device 6 determines that the wall is 102 inches tall.

The spacing between grid lines, dots, or other shapes is chosen to optimize the effectiveness of the video content analysis by basing the decision on the resolution of the camera images and the distance between a pattern generator and a camera. For instance, turning to FIG. 2, the greater the distance between the camera 4 and the pattern generator 50 and the lower the image resolution, the larger the required spacing between grid lines of the pattern generator 50 necessary so that the image analysis device 6 can distinguish between each line. Conversely, if the camera 4 is closer to the pattern generator 50 or the resolution is higher, a smaller spacing between grid lines is possible, which improves the precision of the image analysis.

Thus, the invention provides, among other things, a video content analysis system and method that can detect an object more easily than conventional video content analysis software because it can detect a known pattern output from a pattern generator regardless of lighting conditions. Various features and advantages of the invention are set forth in the following claims.

What is claimed is:

1. An image content analysis security system comprising:
   one or more non-visible electromagnetic radiation emitters attached in a pattern to a wall or floor;
   a camera configured to perceive the pattern of non-visible electromagnetic radiation, capture images including an object and at least a portion of the pattern, and output captured images as image data; and
   an image analysis device configured to receive calibration information, receive the image data, and determine attributes of the object based on the image data and calibration information.

2. The image content analysis security system of claim 1, wherein the attributes that the image analysis device is configured to determine include one of an outline of the object, a size of the object, and a position of the object.

3. The image content analysis security system of claim 1, wherein the one or more non-visible electromagnetic radiation emitters are configured to passively produce the pattern using electromagnetic radiation or chemical reactions.

4. The image content analysis security system of claim 1, wherein the one or more non-visible electromagnetic radiation emitters are configured to actively produce the pattern using an electric power supply.

5. The image content analysis security system of claim 1, wherein the pattern of non-visible electromagnetic radiation comprises infrared electromagnetic radiation.

6. The image content analysis security system of claim 1, wherein the image analysis device is further configured to determine room dimensions.

7. The image content analysis security system of claim 1, wherein the calibration information includes at least one of camera calibration information or pattern calibration information, wherein the camera calibration information includes at least one of the height of the camera, the distance between the camera and a first wall, an angle between the camera and a second wall; and the pattern calibration information includes at least one of a type of pattern, a spacing between any elements within the pattern, and a wavelength range of the non-visible electromagnetic radiation of the pattern.

8. The image content analysis security system of claim 1, wherein the image analysis device is configured to determine object attributes based on image data and calibration information by identifying one or more portions of the pattern that are blocked in the image data.

9. A method of analyzing image content for a security system comprising the steps of:
   attaching one or more non-visible electromagnetic radiation emitters to a wall or a floor in a pattern;
   providing calibration information to an image analysis device;
   emitting a pattern of non-visible electromagnetic radiation from the one or more non-visible electromagnetic radiation emitters;
   positioning a camera at a location so that the camera perceives the pattern of non-visible electromagnetic radiation;
   capturing images with the camera of an area containing an object and at least a portion of the pattern;
   outputting the captured images as image data to the image analysis device;
   determining attributes of the object based on the image data and the calibration information; and
   outputting at least one determined attribute.

10. The method of analyzing image content for a security system of claim 9 further comprising the step of: determining dimension attributes of the area in which the one or more non-visible electromagnetic radiation emitters positioned.

11. The method of analyzing image content for a security system of claim 9, wherein the step of emitting a pattern of non-visible electromagnetic radiation from the one or more non-visible electromagnetic radiation emitters includes an active emission using an electric power supply.

12. The method of analyzing image content for a security system of claim 9, wherein the step of emitting a pattern of non-visible electromagnetic radiation from the one or more non-visible electromagnetic radiation emitters includes a passive emission using incoming electromagnetic radiation or chemical reactions.

13. The method of analyzing image content for a security system of claim 9, wherein the step of providing calibration information to an image analysis device includes providing at least one of camera calibration information and pattern calibration information, wherein the camera calibration information includes at least one of the height of the camera, the distance between the camera and a first wall, an angle between the camera and a second wall; and the pattern calibration information includes at least one of a type of pattern, a spacing between any elements within the pattern, and a wavelength range of the non-visible electromagnetic radiation of the pattern.

14. The method of analyzing image content for a security system of claim 9, wherein the pattern emitted from the one or more non-visible electromagnetic radiation emitters is one of a grid, a fractal pattern, a dot-arrangement, repeating triangles, repeating circles, and repeating rectangles.

15. The method of analyzing image content for a security system of claim 9, further comprising the step of selecting one or more non-visible electromagnetic radiation emitters based on an image resolution of the camera and the distance between the camera and the one or more non-visible electromagnetic radiation emitters.

16. The method of analyzing image content for a security system of claim 9, wherein the step of determining attributes of the object based on image data and calibration information includes: determining an object is present because one or more portions of the pattern are blocked in the image data; and calculating at least one of the size of the object, the position of the object, and an outline of the object based on the one or more portions of the pattern that are blocked and the calibration data.

17. An image content analysis security system comprising:
a pattern generator means to produce a pattern of non-visible electromagnetic radiation, the pattern generator means attached to a wall or floor;
a camera means to perceive the pattern of non-visible electromagnetic radiation, capture images including an object and at least a portion of the pattern, and output captured images as image data; and
an image analysis means to receive calibration information, receive the image data, and determine attributes of the object based on the image data and calibration information.

18. The image content analysis security system of claim 17 further comprising:
a storage means to store the determined attributes; and a display means to display the image data and determined attributes.

19. The image content analysis security system of claim 17, wherein the calibration information includes at least one of camera calibration information and pattern calibration information, the camera calibration information includes at least one of the height of the camera, the distance between the camera and a first wall, an angle between the camera and a second wall; and the pattern calibration information includes at least one of a type of pattern, a spacing between any elements within the pattern, and a wavelength range of the non-visible electromagnetic radiation of the pattern.

20. The image content analysis security system of claim 17, wherein the image analysis means determines attributes of the object based on image data and calibration information by identifying one or more portions of the pattern that are blocked in the image data.

* * * * *